United States Patent [19]

Leskovec et al.

[11] 4,009,765
[45] Mar. 1, 1977

[54] ADJUSTABLE LIFT CHAIN ANCHOR FOR FORK LIFT MAST UNITS

[75] Inventors: Edward V. Leskovec, Eastlake; James A. Kulhanek, Perry, both of Ohio

[73] Assignee: Towmotor Corporation, Mentor, Ohio

[22] Filed: May 7, 1975

[21] Appl. No.: 575,303

[52] U.S. Cl. .................... 187/9 E; 59/93; 403/46

[51] Int. Cl.² ............ B66B 9/20; F16G 11/12

[58] Field of Search .......... 187/9 R, 9 E, 1 R, 1 A, 187/17; 403/49, 299, 300, 104, 106, 118, 43, 44, 46; 59/93; 74/501 R, 501 P, 522; 254/67; 85/8.6, 8.8; 151/69

[56] References Cited

UNITED STATES PATENTS

| 407,559 | 7/1889 | Wells | 403/44 |
|---|---|---|---|
| 3,208,556 | 9/1965 | Shaffer | 187/9 E |
| 3,289,726 | 12/1966 | Sauter | 85/8.8 X |
| 3,298,463 | 1/1967 | McIntosh | 187/9 E |
| 3,433,324 | 3/1969 | McIntosh | 187/9 E |

FOREIGN PATENTS OR APPLICATIONS

| 6,907 | 2/1903 | United Kingdom | 403/46 |
|---|---|---|---|
| 123,897 | 3/1919 | United Kingdom | 403/44 |
| 714,774 | 9/1954 | United Kingdom | 403/46 |

Primary Examiner—Evon C. Blunk
Assistant Examiner—James L. Rowland
Attorney, Agent, or Firm—Phillips, Moore, Weissenberger, Lempio & Majestic

[57] ABSTRACT

An adjustable anchor employed within a triple-lift fork mast unit of a type wherein opposing ends of two lift chains are adjustably secured to a common base structure such as an intermediate upright unit, the anchor including a housing attached to the intermediate upright unit and defining a bore with a spherical taper formed about one end of the bore, an adjusting sleeve arranged within the bore and having a spherical shoulder for bearing engagement with the spherical taper, a portion of the sleeve being knurled to facilitate its rotation within the bore for adjusting its threaded engagement with a connector secured to one of the lift chains, the other chain also being adjustably secured to the housing. The adjustable anchor is also contemplated as an intermediate article of manufacture wherein the housing is suitable for engagement to a base structure such as the intermediate upright unit and further including retaining means for maintaining the sleeve within the bore prior to its threaded engagement with the connector for the lift chain.

7 Claims, 4 Drawing Figures

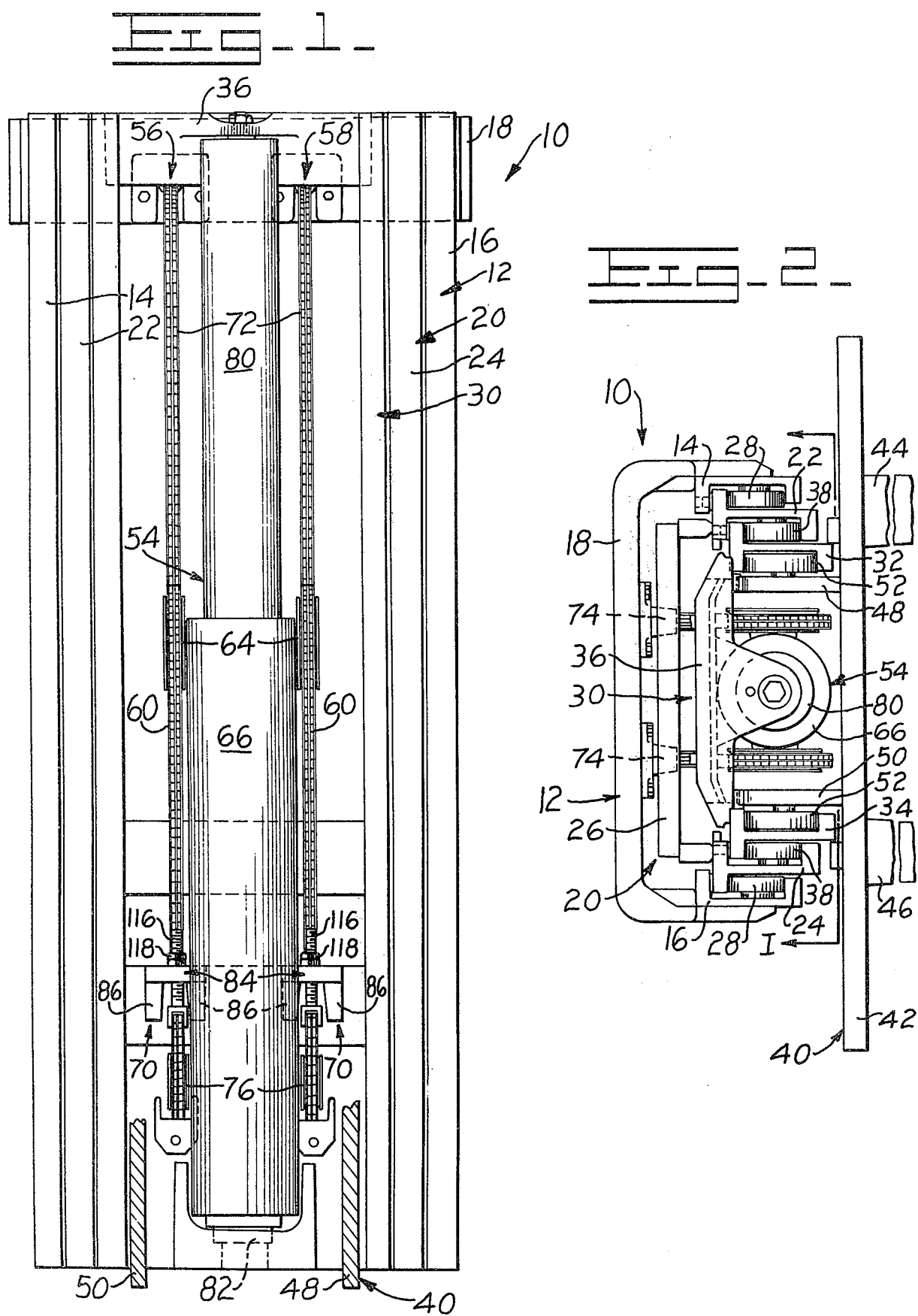

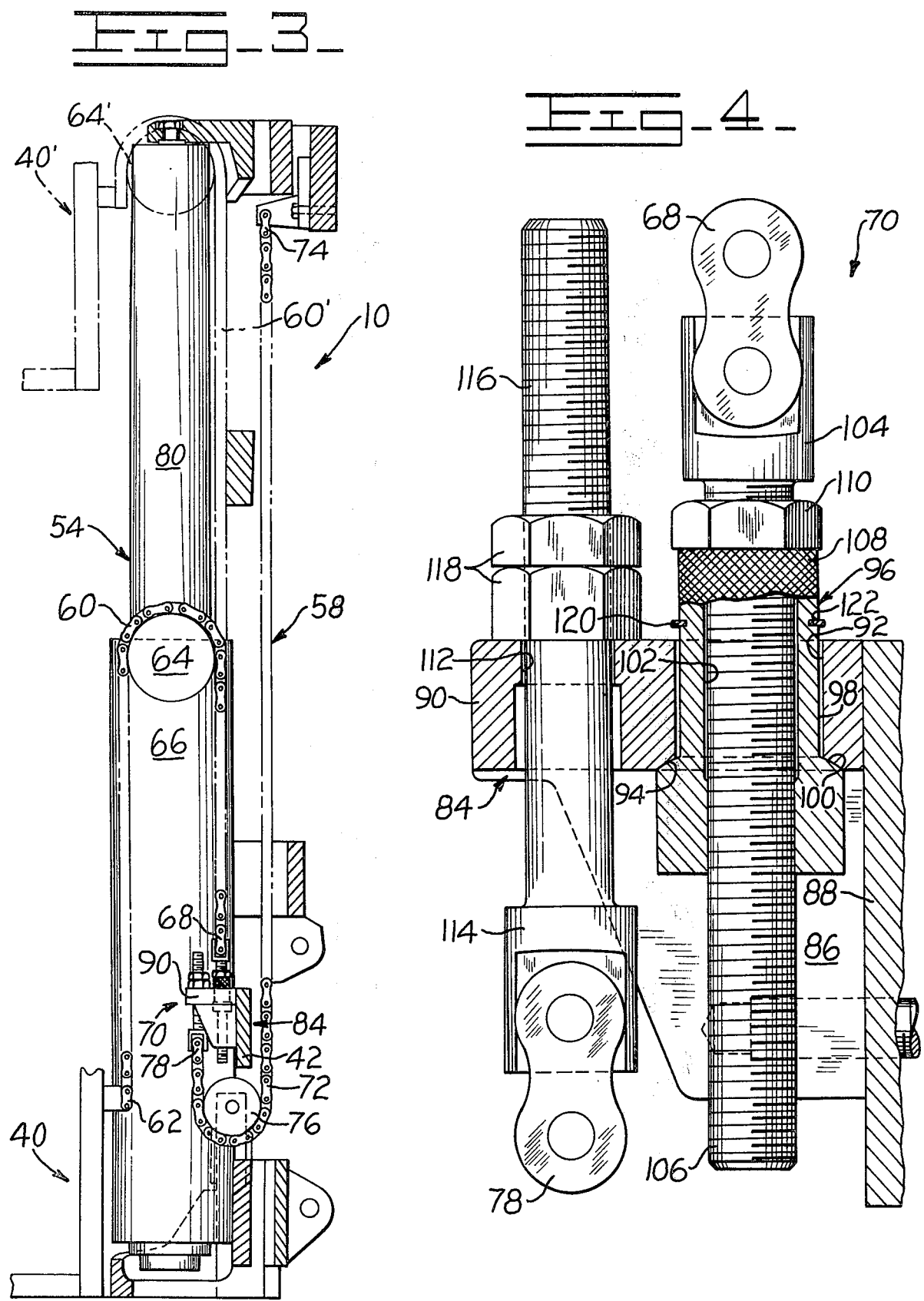

ADJUSTABLE LIFT CHAIN ANCHOR FOR FORK LIFT MAST UNITS

BACKGROUND OF THE INVENTION

The present invention relates to an adjustable anchor for use in fork lift mast units as well as to the adjustable anchor as an article of manufacture for subsequent use in the assembly of such a mast unit.

Lift truck mast units commonly employ lift chains in pairs, the lift chains being trained over sheaves mounted upon a movable portion of a lift jack for raising a carriage relative to one upright portion of the mast. The adjustable anchor of the present invention is particularly described below with reference to a full, free triple-lift mast unit wherein the lift chain on each side of the mast is formed in two lengths, each of the lengths being adjustably secured at a common point. Adjustment is necessary to insure that the chains are under similar tension so that loads arranged upon the carriage are distributed equally by the parallel lift chains.

SUMMARY OF THE INVENTION

Accordingly, it is an object of the present invention to provide an adjustable anchor as a portion of a fork lift mast unit to adjustably secure one and preferably two opposed lift chain ends, the adjustable anchor being configured to facilitate adjustment of a single lift chain or to facilitate adjustment for two opposed lift chain ends.

It is also an object of the invention to provide an adjustable anchor as an article of manufacture for subsequent arrangement upon a fork lift mast unit as described above.

It is another object of the invention to provide such an adjustable anchor for either one or two lift chain ends wherein the anchor includes a spherical bearing to compensate for lateral movement between the lift chain and anchor during operation of the mast unit.

Additional objects and advantages of the invention are made apparent in the following description having reference to the accompanying drawings.

DESCRIPTION OF THE DRAWINGS

FIG. 1 ia a front elevation view, with portions being removed for simplicity, of a fork lift mast unit providing an environment for the adjustable anchor of the present invention.

FIG. 2 is a plan view of the fork lift mast unit taken from the top of FIG. 1, section lines I—I further illustrating the relation of FIG. 1 to the view in FIG. 2.

FIG. 3 is a side view in elevation, with parts in section, taken from the right side of FIG. 1.

FIG. 4 is an enlarged fragmentary view of an adjustable anchor suitable for use within the fork lift mast unit of FIGS. 1–3 or as an article of manufacture suitable for subsequent use in construction of such a mast unit.

DESCRIPTION OF THE PREFERRED EMBODIMENT

The present invention is particularly directed toward an adjustable lift chain anchor, as best illustrated in FIG. 4, either as a portion of a fork lift mast unit of the type illustrated in FIGS. 1–3 or as an article of manufacture for subsequent use in the assembly of such a mast unit. The adjustable anchor is contemplated for use in any mast unit of a type requiring flexible, elongated chain means for raising a carriage relative to an upright section in the mast unit. A full, free triple-lift mast unit is illustrated in FIGS. 1–3 only as a preferred environment for the adjustable anchor or as a structure wherein the adjustable anchor may be employed as an assembly element.

A full, free triple-lift mast unit of the type referred to above is generally indicated at 10 in FIGS. 1–3. Construction of the mast unit 10 is set forth only in brief summary to the extent necessary to demonstrate the function and mode of operation for the adjustable anchor of the present invention as described in greater detail below.

Referring now to FIGS. 1–3 and particularly to FIG. 2, the mast unit 10 includes a fixed upright portion 12, comprising a pair of vertical beams 14 and 16 secured in spaced apart relation by cross members such as that indicated at 18.

An intermediate movable mast unit or assembly 20 includes a pair of upright structural beams 22 and 24 similarly secured together in spaced apart relation by cross pieces such as that indicated at 26. The beams 22 and 24 of the intermediate mast assembly 20 are nested between the upright beams 14 and 16. Rollers such as those indicated at 28 are arranged between the adjacent pairs of beams 14, 22 and 16, 24 to facilitate movement of the intermediate mast assembly 20 relative to the fixed upright or mast unit 12.

An inner mast unit or assembly 30 also comprises a pair of upright structural beams 32 and 34 secured in spaced apart relation by cross pieces such as the header indicated at 36. The inner mast unit 30 is also nested between the intermediate upright beams 22 and 24 with rollers such as those indicated at 38 facilitating relative movement therebetween.

A carriage unit 40 includes cross pieces such as that indicated at 42 and one or more forwardly projecting forks indicated at 44 and 46. Those elements of the carriage unit are supported by rails 48 and 50 which are nested between the inner beams 32 and 34. The rails 48 and 50 are supported for movement relative to the inner mast unit 30 by means of rollers such as those indicated at 52. Movement of the carriage unit 40, the inner mast unit 30 and the intermediate mast assembly 20 relative to each other and the fixed upright unit 12 is initiated and regulated by a conventional motor or hydraulic jack of compound structure, as indicated at 54, together with similar, parallel lift chain units 56 and 58. The lift chain unit 58 is illustrated in greater detail in FIG. 3.

Referring particularly to FIGS. 1 and 3, each lift chain unit includes a carriage lift chain 60 secured at one end 62 to the carriage unit 40 and trained over a sheave 64 mounted upon an outer motor cylinder 66. The other end 68 of the chain 60 is adjustably secured to a bottom portion of the inner mast unit 30 by means of the adjustable anchor of the present invention as generally indicated at 70.

To facilitate triple-acting operation of the mast unit, each of the lift chain units 56 and 58 includes a second mast lift chain 72 secured at one end 74 to the cross member 18 at the top of the fixed upright unit 12. Each of the mast lift chains 72 is trained about a sheave 76 secured for rotation at the bottom of the intermediate mast assembly 20, the other end 78 of each chain 72 also being adjustably secured to the respective adjustable anchor 70.

In operation, the outer cylinder 66 for the motor 54 rises first because of its greater effective cross-sectional area until the sheaves 64 and carriage 40 are in the raised positions illustrated in phantom in FIG. 3. Thereafter, continued operation of the motor causes the outer cylinder 66 and an intermediate cylinder 80 to both be raised relative to a rod portion 82 of the motor which is secured to the bottom of the intermediate mast assembly 20. It may be further seen, particularly in FIG. 1, that the intermediate cylinder 80 is secured at its top to the header 36 for the inner mast unit 30. Continued extension of the motor in the manner described above causes the inner mast unit 30 to be raised relative to the intermediate mast assembly 20 and, at the same time, causes the intermediate mast assembly 20 to be raised relative to the fixed upright unit 12 in order to achieve full extension of the mast unit 10 for maximum elevation of the carriage unit 40.

In any event, when the carriage unit 40 is at ground level, each of the lift chain units 56 and 58 has both its carriage lift chain 60 and mast lift chain 72 doubled back upon themselves. During initial elevation of the carriage, when only the carriage is moving relative to the inner mast, the carriage lift chain portion 60 for each of the chain units approaches a straight line extension as represented in part by the phantom illustration of FIG. 3. During subsequent elevation of the carriage, the mast lift chain 72 also approaches a straight line configuration in order to carry the sheaves 76 upwardly toward the top of the fixed upright unit and achieve full extension of the mast unit as described above.

Each of the chain units 56 and 58 must be under similar tension for all elevations of the carriage in order to properly distribute the weight of the carriage and its load throughout the various portions of the mast unit. This may be accomplished by the adjustable anchor of the present invention. Generally, each anchor 70 permits tension adjustment in each of the associated chain portions 60 and 72 to assure that they are under equal tension when the carriage is at ground level. Accordingly, during subsequent elevation of the carriage, the lift chain units 56 and 58 will serve to uniformly support the weight of the carriage and its load.

The adjustable anchor 70 is best illustrated in FIG. 4. Before proceeding to a detailed description, it is initially noted that the present invention contemplates both an adjustable anchor for a pair of opposed chain ends as may be seen within the the lift unit described above or as an adjustable mounting for a single lift chain end such as the chain end 68. It will of course be obvious that, in providing an adjustable mounting for a single chain end, the anchor could alternatively be arranged upon the carriage or the header 36 where the chain portions 60 and 72 are illustrated as having fixed anchors. However, the adjustable anchor 70 is described herein as being arranged at the bottom of the inner mast unit 30 to permit it to serve as an adjustable anchor for each of the chains 60 and 72. In addition, this location provides a more protected environment for the adjustable anchor.

Referring now particularly to FIG. 4, each adjustable anchor 70 includes a housing 84 having side walls 86 which may be secured, for example, by welding, to a base or structural portion 88 arranged as described above at the bottom of the inner mast unit 30. A horizontal plate 90 defines a vertical bore 92 having a spherical taper formed by the plate 90 about the bore 92.

An adjusting sleeve 96 is arranged within the bore 92 with its outer diameter 98 being substantially less than the diameter of the bore 92 in order to permit angular movement of the sleeve 96 relative to the axis of the bore.

The sleeve 96 is further formed with a spherical shoulder 100 for mating engagement with the spherical taper 94 and an internal threaded bore as indicated at 102.

A connector 104 is secured to the adjacent end of the carriage lift chain 60 and has a threaded shank 106 which engages the threaded bore 102.

An exposed surface portion 108 of the sleeve 96 is preferably configured, for example, by knurling, to facilitate its rotation within the bore 92. A lock nut 110 is also threaded upon the shank 106 for abutting engagement with the upper end of the sleeve 96 in order to selectively lock the sleeve against undesirable rotation relative to the connector 104 and the anchor housing 84.

In order to also provide an anchor for each of the mast lift chains 72 as well, the plate 90 within each adjustable anchor forms an additional bore 112 preferably arranged on an outer portion of the plate 90. In this manner, a connector 114 secured to an adjacent end of the mast lift chain 72 may be arranged with its threaded shank 116 extending through the bore 112 for adjustable engagement by a pair of nuts 118.

A wrench may be readily fitted onto the nuts 118 in order to reposition the connector 114 and thereby adjust tension within the associated mast lift chain 72. Adjustment of the carriage lift chain 60 and its connector 104 would not normally be quite as simple due to the difficulty of access in the close space between the nuts 118 and the base structure 88. However, the knurled configuration upon the sleeve 96 tends to facilitate rotation of the sleeve within the bore 92 even in the close environment afforded by the adjustable anchor.

The adjustable anchor including the sleeve 96 is also contemplated as an article of manufacture for subsequent use within the assembly of a mast unit of the type illustrated in FIGS. 1-3. The construction of the adjustable anchor and sleeve would of course be identical with that described above. However, the present invention contemplates an additional feature to further facilitate assembly of the adjustable anchor. Referring particularly to FIG. 4, a removable snap ring 120 is arranged within a groove 122 formed upon an intermediate surface portion of the sleeve 96. Accordingly, the sleeve 96 may initially be inserted within the bore 92 and maintained therein by use of the snap ring 120. This assures that the sleeve 96 is maintained in place until it is engaged by the threaded shank 106.

The two adjustable anchor assemblies 70 illustrated in FIG. 1 are of identical structure to provide uniform tensioning within the lift chain units 56 and 58.

We claim:

1. An adjustable anchor for a lift chain means in a fork lift mast unit of a triple lift type including a carriage, at least one upright mast unit movable relative to a fixed upright, a carriage and a motor means, the lift chain means being trained over the motor means for connection at its opposite ends to the carriage and the upright unit respectively, the adjustable anchor being arranged at one adjacent end of the lift chain means and comprising a housing including means attached to a base structure and means defining a bore arranged parallel to the adjacent end of the lift chain means, a spherical taper being formed about one end of the bore opposite the adjacent end of the lift chain means, an adjusting sleeve arranged within the bore and having an outer diameter arranged in spaced-apart relation from the bore with a spherically shaped, annular shoulder arranged for bearing engagement with the spherical taper on the housing, the sleeve extending through the bore toward the adjacent end of the lift chain means, a peripheral portion of the sleeve being configured to facilitate its rotation within the bore, the sleeve further defining a threaded internal bore, and a connector being secured to the adjacent end of the lift chain means and having a shank arranged in threaded engagement with the internal threaded bore within the sleeve, the adjustable anchor also providing an adjustable base for an additional lift chain means having one end extending toward the adjustable anchor in a direction opposite from the adjacent end of the one lift chain means, the anchor further comprising additional means adjustably engaged with the adjacent end of the additional lift chain means.

2. The adjustable anchor of claim 1 further comprising a lock nut arranged upon the threaded shank for engagement with an end of the sleeve to selectively limit relative rotation between the sleeve and the connector.

3. The adjustable anchor of claim 1 wherein the base structure is a portion of the upright unit, the opposite end of the lift chain means being secured in fixed relation to the carriage.

4. An adjustable anchor as an article of manufacture subsequently employable to provide an adjustable coupling with an adjacent end of a lift chain means in a fork lift mast unit, comprising an adjustable anchor housing including means for attachment to a base structure and forming a bore with a spherical taper defined about one end thereof, an adjusting sleeve extending through the bore and having an outer diameter substantially smaller than the bore to permit angular movement of the sleeve relatively to its axis within the bore, the sleeve forming a spherically shaped, annular shoulder arranged in facing relation with the spherical taper of the housing, the sleeve extending through the bore and defining an inner threaded bore for engagement with a suitable connector secured to the adjacent end of the lift chain means and having a threaded shank, removable means arranged upon the sleeve for engagement with the housing opposite the spherical taper in order to retain the sleeve within the bore prior to its engagement with the threaded shank of the connector, and adjustable means for engagement with the adjacent end of the additional lift chain means arranged opposite the bore in the anchor housing from the attachment means, a peripheral surface portion of the sleeve being configured to facilitate its rotation within the bore of the anchor housing.

5. The adjustable anchor of claim 4 wherein a peripheral surface portion of the sleeve adjacent the removable retaining means is configured to facilitate rotation of the sleeve within the bore of the anchor housing.

6. The adjustable anchor of claim 5 wherein a peripheral surface portion of the sleeve adjacent the removable retaining means is knurled.

7. The adjustable anchor of claim 4 wherein the means for adjustable connection with the adjacent end of the additional lift chain means comprises an additional bore formed by the anchor housing to receive a shank portion of a connector attached to the adjacent end of the additional lift chain means.

* * * * *